United States Patent

[11] 3,628,026

| [72] | Inventor | David V. Cronin |
| | | West Peabody, Mass. |
| [21] | Appl. No. | 855,546 |
| [22] | Filed | Sept. 5, 1969 |
| [45] | Patented | Dec. 14, 1971 |
| [73] | Assignee | Dynamics Research Corporation |
| | | Wilmington, Mass. |

[54] LINEAR ENCODER IMMUNE TO SCALE BENDING ERROR
7 Claims, 4 Drawing Figs.

[52] U.S. Cl. .................................................... 250/231 R,
250/219 D, 250/237 G
[51] Int. Cl. .................................................... G01d 5/34
[50] Field of Search .......................................... 250/231,
237 G, 237, 219 D

[56] References Cited
UNITED STATES PATENTS
| 3,330,149 | 7/1967 | Scott | 250/219 IDD |
| 3,483,389 | 12/1969 | Cronin | 250/219 ID |

*Primary Examiner*—James W. Lawrence
*Assistant Examiner*—C. M. Leedom
*Attorney*—Joseph Weingarten

ABSTRACT: A linear encoder in which scale bending error does not materially affect encoder performance. An elongated generally rectangular encoder scale is provided having a plurality of alternately light responsive and opaque segments on one surface thereof and a plurality of similar segments on an opposite surface thereof, the segments on one surface experiencing equal and opposite deformation to the segments on the opposite surface in the presence of bending stress. An interference pattern sensed from both pluralities of segments is not materially affected by such bending stress, with the result of markedly improved encoder performance under-bending error conditions.

Patented Dec. 14, 1971 3,628,026

INVENTOR
DAVID V. CRONIN
BY
ATTORNEYS

LINEAR ENCODER IMMUNE TO SCALE BENDING ERROR

FIELD OF THE INVENTION

This invention relates to electro-optical encoders and more particularly to linear encoders operative to provide accurate position measurement in the presence of scale-bending error.

BACKGROUND OF THE INVENTION

Electro-optical encoders used for the determination of linear movement generally include an elongated scale having alternately light transmissive and opaque segments. Optical means are provided for producing an interference pattern of the segments and variations in the interference pattern are detected which are representative of the degree of scale movement. To provide precise measurement, the spacing between segments ruled on the outer surface of a scale must be maintained within extremely close tolerances. Bending of the scale which can occur, for example, during the mounting thereon on utilization apparatus or by reason of temperature variations, causes variation in the segment spacing, by reason of stretching or compression of the scale surface, which results in inaccuracy in encoder operation. Attempts to eliminate bending error have generally involved the design of special scale members in which the bending moment is reduced. The special design of such scale members however adds considerably to their cost and complexity and in addition such scales usually have a nonplanar configuration which can complicate the optical design of the encoder with which such scales are employed.

SUMMARY OF THE INVENTION

In accordance with the present invention an encoder is provided in which bending errors of the encoder scale do not materially affect system performance. An elongated generally rectangular scale is employed in which a plurality of alternately light responsive and opaque segments are formed on one surface thereof and a plurality of similar light responsive and opaque segments formed on the opposite surface thereof. Both sets of segments are employed to provide an interference pattern which is insensitive to scale-bending error. Any bending of the scale about an axis transverse to the scale segments will cause compression of the code segments on one scale surface and corresponding expansion of the code segments on the opposite scale surface. Distortion of the segments and the segment spacing is compensated by the substantially equal and opposite segment movement and thus there is no effective scale distortion to cause error in the encoder operation.

DESCRIPTION OF THE DRAWINGS

The invention will be more fully understood from the following detailed description, taken in conjunction with the accompanying drawings in which.

DETAILED DESCRIPTION OF THE INVENTION

Figure 1:
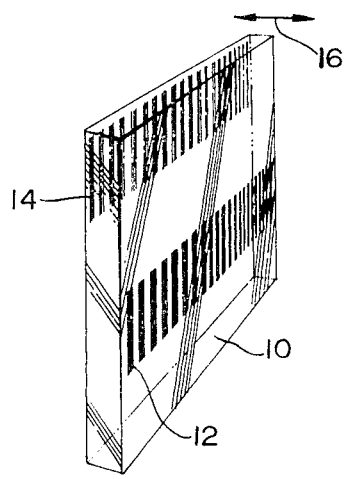
FIG. 1 is a broken away pictorial view of an encoder scale according to the invention.

A linear encoder scale for providing, according to the invention, encoder operation substantially immune to bending error is illustrated in FIG. 1 and includes an elongated generally rectangular member 10 formed of a light transmissive material such as glass. A plurality of alternately light transmissive and opaque segments 12 are formed in a parallel array on one surface of scale member 10, while an identical plurality of alternately light transmissive and opaque segments 14 are formed in a parallel array on the opposite surface of scale member 10. The array of segments 12 and 14 are laterally displaced from one another, as illustrated in FIG. 1, along an axis orthogonal to the longitudinal axis of the scale and are substantially parallel along the length of the scale with the segments of each array being substantially in alignment with the other. Bending of scale member 10 in a direction transverse to the longitudinal axis of scale 10, in the direction of arrows 16 in FIG. 1, causes tensile stretching of one surface of the scale member and compression of the opposite surface of the scale member. The spacing of the segments formed on the stretched surface increases due to the bending stress while the spacing between the segments formed on the surface in compression are decreased due to the bending stress of the scale. The scale elongations on one surface are substantially equal to the scale compressions on the opposite scale surface and, according to the invention, the equal and opposite scale segment deviations are utilized to provide an electro-optical encoder substantially immune to such segment spacing errors.

It will be appreciated that segments 12 and 14 are shown in exaggerated form for clarity of discussion. In reality, the scale segments are of extremely narrow width and spacing. Typical encoder scales may have 50 to 5,000 segments per inch formed thereon.

The uniquely ruled scale described hereinabove is cooperative with an electro-optical assembly which is operative to provide an interference pattern of the scale segments and to detect variations in light transmitted by the interference pattern representative of the degree of relative motion between the scale and associated electro-optical assembly. One embodiment of the invention is illustrated diagrammatically in FIG. 2 in which scale member 10 is depicted in an end view with segments 12 being illustrated on edge on one surface of scale member 10 and segments 14 being illustrated on edges on the opposite scale surface of member 10. The illustrated embodiment shows an encoder wherein the interference pattern is produced by superimposition of scale rulings with an image of the rulings, such an imaging-type encoder being described in detail in copending application Ser. No. 699,969, filed Jan. 23, 1968, now U.S. Pat. No. 3,496,364 and assigned to the assignee of the present invention.

Figure 2:
FIG. 2 is a diagrammatic representation of one embodiment of the invention.

Referring to FIG. 2, an illumination source, including lamp 18 and lens 20, directs a beam of light through scale segments 12, the transmitted light being directed by lens assembly 22 and right-angle prism 24 to a pentaprism 26 which doubly reflects the light to a second lens assembly 28 and thence through scale segments 14. The light transmitted through segments 14 is received by photosensitive detector 30, the output of photodetector 30 being applied to encoder circuitry 32 operative to provide an indication of the degree of relative motion between scale member 10 and the associated optical assembly. Encoder circuitry 32 can also be operative in a well-known manner to provide an indication of the sense of relative scale motion derived from a multiphase fringe pattern, as is known in the art.

In operation, an image of scale segments 12 is projected onto scale segments 14 by the illustrated optical assembly such that upon relative movement of scale 10 along its longitudinal axis, that is, in a direction in and out of the drawing in FIG. 2, motion of the rulings and its image occur in opposite directions to produce an interference pattern representative of relative scale motion. If N segments are provided along the active length of scale member 10, countermotion of the scale segments and the image thereof causes 2N segments to be sensed by the encoder. If scale member 10 is bent such that the spacing of segments 14 is decreased by an amount $\delta$ then along the active distance there will be N−Δ lines on the expanded surface of the scale, and N+Δ lines on the compressed surface of the scale. By operation of the encoder optics, the rulings on one surface of the scale are superimposed on an image of the rulings on the opposite surface of the scale; therefore, the error component Δ cancels resulting in only the intended 2N segments being sensed along the active scale length. Thus, according to the invention errors due to scale bending are effectively eliminated and a true reading of the encoder scale is achieved to provide an accurate output indication of relative scale motion even in the presence of bending stress distortion.

Encoder operation by superimposition of an image of the scale segments with the segments themselves is described in detail in the aforementioned copending application. In general, an interference pattern is produced by countermotion of the image and the scale segments, and such pattern is produced in a manner substantially insensitive to the tilt or skew of the segments in the plane of the scale. Analysis of the image reversals through the optics of FIG. 2 will reveal that an image of the scale segments is rotated 180° in the plane of the scale and remains parallel to the segments to produce the requisite fringe pattern. Scale rotation about an axis parallel to the scale segments also tends to cancel by reason of equal and opposite scale displacement. The optics have a depth of field sufficient to accommodate for scale-to-optical head-spacing variations which may occur during operation.

In order to indicate the direction or sense of relative scale motion, two or more out-of-phase signals must be produced, the relative phase relationship of these signals providing a measure of the direction of movement. An encoder constructed according to the present invention can provide such sense determination by utilizing such out-of-phase signals. As is well known, the out-of-phase signals are produced by establishing a moving fringe pattern having out-of-phase portions which are sensed to provide the intended multiphase electrical signals. As described in the aforementioned copending application, such out-of-phase signals can be provided by altering the image of the scale segments such that when superimposed on the segments themselves a fringe pattern is produced from which out-of-phase signals can be detected. The image of the segments can be magnified or diminished in size as compared with the actual scale segments by means of one or more of the lenses employed in the encoder optical assembly. The photodetector 30 in such an embodiment includes a plurality of photosensors each arranged to detect light from an out-of-phase portion of the fringe pattern produced. Typically a pair of photosensors are employed to sense fringe patterns which are 90° out-of-phase to provide electrical signals correspondingly 90° out-of-phase. The out-of-phase output signals are processed by well-known circuitry to provide an output indication of the sense as well as the extent of relative scale motion.

Figure 3:
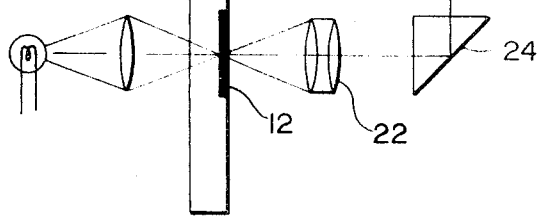
FIG. 3 is a diagrammatic representation of an alternative embodiment of the invention.
Figure 3:
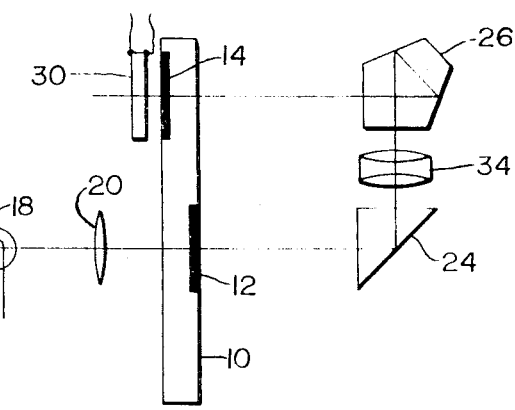

An alternative embodiment of the invention is illustrated in FIG. 3 similar to the system of FIG. 2 except that a lens assembly 34 is disposed in light-transmitting relationship between right-angle prism 24 and pentaprism 26. The optical arrangement employed in this embodiment is, therefore, somewhat more simplified than that of FIG. 2 in that only a single lens assembly 34 is employed rather than the two lens assemblies 22 and 28 in FIG. 2. Encoder operation is accomplished substantially as in FIG. 2. Light from lamp 18 is directed by means of lens 20 through the scale segments 12 formed on one surface of scale member 10 and thence to right-angle prism 24 which directs the light through lens assembly 34 to pentaprism 26 which doubly reflects the light and the image of segments 12 onto scale segments 14 formed on the opposite surface of scale member 10.

As discussed above, photodetector 30 disposed in juxtaposition to segments 14 receives light from the interference pattern produced by the scale rulings and the image thereof superimposed on the rulings and produces an electrical signal representative of the degree of relative scale motion. This signal can be applied to well-known encoder circuitry, such as circuitry 32 in FIG. 2 operative to provide an output indication of the amount of relative scale movement.

Figure 4:
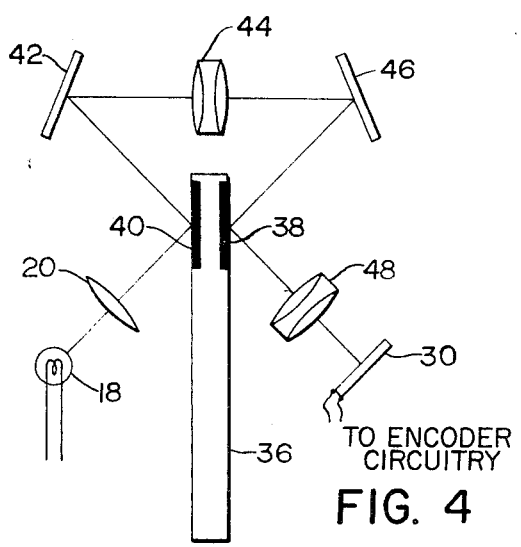
FIG. 4 is a diagrammatic representation of a further embodiment of the invention utilizing a reflective encoder scale.

The invention can also be embodied in an electro-optical encoder having a scale member of alternately light reflective and opaque segments. One such embodiment is illustrated in FIG. 4 and includes a scale member 36 having formed on one surface thereof a plurality of alternately light reflective and opaque segments 38 and on the opposite surface thereof a like plurality of light reflective and opaque segments 40. In this embodiment, scale member 36 can be formed of an opaque material such as metal, with reflective segments 38 and 40 formed on respective opposite surfaces thereof by well-known techniques such as by photoetching. Of course, as an alternative, the surface of scale member 36 can be reflective and scale segments formed thereon by the provision of opaque areas. In the illustrated embodiment, segments 38 and 40 are disposed on respective opposite surfaces of scale member 36 along the upper edges of the scale. Light from lamp 18 is directed through lens 20 onto segments 40 which reflect the light to a mirror 42 which directs the light through a lens assembly 44 to a second mirror 46 which reflects the light to segments 38 and thence through lens assembly 48 to photodetector 30. The optics is operative to project an image of the segments 40 upon the segments 38 to provide an interference pattern which, upon relative motion of scale member 36 along the length of the scale produces a variable light pattern sensible by photodetector 30. The detector can be connected as described hereinabove to well-known encoder circuitry which provides an output indication of the degree of relative scale motion.

In order to provide an indication of the sense of relative scale motion in addition to a measure of the degree of relative scale motion, an interference pattern should be provided having out-of-phase portions, the relative phase of which is representative of the sense of scale movement. Such an interference pattern having out-of-phase portions thereon can be provided by a variety of well-known techniques. A particularly effective technique useful in imaging encoders such as the embodiments described herein is to alter the size of the image projected upon the scale rulings to provide a resultant fringe pattern having out-of-phase portions. The image size can be conveniently altered without additional components by use of the lens system employed in the optical assembly. In the embodiment of FIG. 2, for example, lens assembly 28 can be operative to magnify the image of rulings 12 projected upon rulings 14 to provide the requisite interference or fringe pattern. To detect the out-of-phase portions of the interference pattern, the photodetector 30 includes a plurality of photosensitive cells each arranged to receive light from a different portion of the interference pattern to provide corresponding out-of-phase electrical signals representative of the sense as well as the extent of relative scale motion. The degree of magnification is affected somewhat by the spurious bending of the scale in a direction transverse of the longitudinal axis thereof (along a direction denoted by arrows 16 of FIG. 1). However, the variation in magnification caused by typical bending stresses is small compared with the intended magnification and does not materially affect encoder performance.

Bending errors encountered in encoder installations are, but for the invention, sufficient to markedly degrade encoder accuracy. For example, in an encoder scale one-fourth of an inch thick and 10 inches long, bending error of 100 microinches is typical and is sufficient to materially degrade encoder performance. The effect of such bending errors are, however, according to the invention, substantially eliminated, with the result that accurate indication of scale motion is provided even in the presence of such bending errors. Installation and alignment of encoder scales is, therefore, less critical than with conventional encoder configurations, and accurate encoder operation is achieved even in those instances where scale bending stresses are difficult to avoid.

What is claimed is:

1. An electro-optical encoder comprising:
    an elongated scale member having first and second substantially parallel plane surfaces thereon, a first plurality of alternately light responsive and opaque segments formed in a parallel array along the longitudinal axis of one surface thereof, and a second like plurality of alternately light responsive and opaque segments formed in a parallel array along the longitudinal axis of the opposite surface thereof;

an optical assembly;

said scale member and said optical assembly being adapted for relative longitudinal movement therebetween;

said optical assembly including:

means for superimposing an image of the segments on one surface of said scale member onto the segments on the opposite surface of said scale member to provide an interference pattern; and means operative to sense variations in light from said interference pattern representative of the extent of relative motion between said scale member and said optical assembly and to produce electrical signals representative of the extent of relative scale motion.

2. An encoder according to claim 1 wherein said light responsive segments are light transmissive, and said first and second pluralities of segments are disposed on respective opposite surfaces of said scale member in lateral spaced relation along an axis orthogonal to the length of said member.

3. An encoder according to claim 2 wherein said optical assembly includes:

means for illuminating the segments on one surface of said scale member; and means for projecting an image of the segments on said one surface onto the segments on the opposite surface of said scale member to provide said interference pattern.

4. An encoder according to claim 1 wherein said light responsive segments are light reflective.

5. An encoder according to claim 1 wherein said light responsive segments are light reflective, and said first and second pluralities of segments are disposed on respective opposite surfaces of said scale member in parallel arrays along one end of said member.

6. An encoder according to claim 2 wherein said optical assembly includes:

an illumination source disposed adjacent one surface of said scale member and operative to illuminate a first portion of the segments formed on the opposite surface thereof;

optical means for projecting an image of the segments of said first portion onto the segments on said one surface of said scale member, said optical means including means for rotating said image 180° in the plane of said scale.

7. An encoder according to claim 6 wherein said optical means includes means for reflecting the image of said first portion in a direction parallel to said scale member; and a pentaprism operative to reflect said image onto the segments on said one surface of said scale member and rotate said image 180° in the plane of said scale member.

* * * * *